United States Patent [19]
Cupo

[11] Patent Number: 4,847,864
[45] Date of Patent: Jul. 11, 1989

[54] PHASE JITTER COMPENSATION ARRANGEMENT USING AN ADAPTIVE IIR FILTER

[75] Inventor: Robert L. Cupo, Eatontown, N.J.

[73] Assignees: American Telephone and Telegraph Company, New York, N.Y.; AT&T Information Systems Inc., Morristown, N.J.

[21] Appl. No.: 209,801
[22] Filed: Jun. 22, 1988
[51] Int. Cl.[4] .............................................. H04B 3/14
[52] U.S. Cl. .................................... 375/14; 364/724.2
[58] Field of Search ..................... 367/45; 364/724.17, 364/724.2; 379/398, 414; 333/18, 28; 375/12, 13, 14, 118

[56] References Cited

U.S. PATENT DOCUMENTS 4,238,746 12/1980 McCool et al. ...................... 333/166
4,253,184 2/1981 Gitlin et al. ............................. 375/14

OTHER PUBLICATIONS

IEEE Trans.Acoustics, etc., vol. ASSP-23, No. 5, Oct. 1975, "Fixed-Point Implementation Algorithms for Class . . . ", J. D. Markel et al, pp. 486-494.
Proc. 31st Midwest Symposium on Circuits & Systems, Aug. 14-15, 1978, "Adaptive Algorithm Considerations of IIR Filters", D. Parikh et al, pp. 369-373.
14th Asilomar Conf. on Circuits, Systems & Computers, Nov. 17-19, 1980, "A Pole-Zero Lattice Form for Adaptive Line Enhancement", B. Friedlander, pp. 380-384.
24th Midwest Symposium on Circuits & Systems, Jun. 29-30, 1981, "The Time Domain IIR Adaptive Digital Filtering Algorithms", D. D. Parikh, pp. 33-37.
16th Asilomar Conf. on Circuits, Systems & Computers, Nov. 8-10, 1982, "Adaptive Line Enhancement & Sinusoidal Burst Detection", N. Ahmed et al, pp. 22-28.
Midcon/82 Conf Record, Nov. 30-Dec. 2, 1982, "On an Adaptive Signal Processing Algorithm", N. Ahmed et al, pp. 3/1/1-7.
Circuits Systems & Signal Processing, vol. 2, No. 4, 1983, "An Infinite Impulse Response Lattice Filter for Adaptive Line Enhancement", B. Friedlander, pp. 391-420.
Proc. of Melecon '83, vol. 2, May 24-26, 1983, "A Second-Order Adaptive IIR Filter with guaanted Stability", pp. C1.07/1-2, D. Manolakis et al.
17th Asilomar Conf. on Circuits, Systems & Computers, Oct. 31-Nov. 2, 1983, "On a Second Order Adaptive Infinite Impulse Response Filter", N. Ahmed et al, pp. 249-254.
22nd IEEE Conf. on Decision & Control, vol. 3 of 3, Dec. 16, 1983, "Analysis and Performance Evaluation of an Adaptive Notch Filter", B. Friedlander, pp. 1325-1330.
IEEE Trans. Information Theory, vol. IT-30, No. 2, Mar. 1984, "Analysis and Performance Evaluation of an Adaptive Notch Filter", B. Friedlander, et al, pp. 283-295.
Proc. of 1984 American Control Conference, Jun. 6, 1984, "On the Detection and Tracking of a Class of Narrowband Sources", N. Ahmed, et al, pp. 210-215.
Intl. Conf. on Digital Processing of Signals in Communications, (Publ. No. 62), 1985, "A Microprocessor Based Recursive Constrained Adaptive Line . . . ", R. Pant. et al, pp. 23-28.
Electronic Letters, Jun. 18, 1987, vol. 23, No. 13, "Cramer-Rao Lower Bound for Cascaded Adaptive Notch Filtering", J. F. Chicharo, pp. 707-708.

*Primary Examiner*—Benedict V. Safourek
*Attorney, Agent, or Firm*—Frederick B. Luludis

[57] ABSTRACT

A voice-band data symbol is typically impaired by so-called phase jitter prior to symbol being received at a data modem. Modem circuitry estimates the phase angle of the jitter and an infinite-impulse-response (IIR) filter adjusts to that phase angle so that the jitter can be corrected for by a demodulator circuit. Advantageously, the IIR filter is arranged so that its pair of complex, conjugate poles are initially positioned at a first predetermined radius within a unit circle. The angular displacement of the poles around the unit circle is adaptively increased in response to receipt of a series of such estimates until such displacement substantially equals the phase angle of the jitter. The poles are then positioned at a second predetermined radius to increase the gain of the filter.

9 Claims, 6 Drawing Sheets

4,847,864

PHASE JITTER COMPENSATION ARRANGEMENT USING AN ADAPTIVE IIR FILTER

FIELD OF THE INVENTION

The present invention relates to modems and more particularly relates to an adaptive infinite-impulse-response filter for use in such modems to correct for phase jitter.

BACKGROUND OF THE INVENTION

Carrier recovery systems are essential to quadrature amplitude modulated (QAM) modems to correct for various signal impairments, such as phase jitter. The latter impairment is typically modeled as a set of sinusoids and is mainly due to power line harmonics and ringing voltages. Adaptive techniques employed to correct for phase jitter include so-called finite-impulse-response (FIR) filter structures. One such FIR filter structure arranged to correct for phase jitter in a modem is disclosed in U.S. Pat. No. 4,320,526 issued Mar. 16, 1982 to R. D. Gitlin. Disadvantageously, an FIR filter structure is relatively slow in converging on the frequency of interest and does not substantially attenuate phase jitter when it is present in a received signal.

SUMMARY OF THE INVENTION

To attenuate phase jitter present in a received signal, an infinite-impulse-response (IIR) filter structure adaptively adjusts the angular displacement of its complex conjugate poles starting from a predetermined angle until the filter converges on the phase of the jitter. The radius of the poles is then increased from a predetermined starting value of less than one to a second predetermined value of less than one to increase the gain of the filter and to substantially attenuate the level of phase jitter.

DETAILED DESCRIPTION

In the transmitter section (not shown) of a modem, digital bits representative of information to be transmitted are received from a digital device, e.g., a terminal, in groups of twenty-eight. These bits are then trellis coded into 8-dimensional signal points, or symbols. Each symbol is then transmitted over a transmission facility, such as the public switched network or a private line network, as four 2-dimensional quadrature carrier pulses in the course of four successive baud intervals of $T=1/2742.8571$ sec. Hopefully, each symbol, or signal, reaches its destination without being impaired. However that is typically not the case. In fact, signals propagating through the public switched network or private line network are subjected to various impairments collectively referred to as the carrier error, $\theta(n)$.

Specifically, the carrier error, $\theta(n)$, includes three major components identified as frequency offset, phase offset and phase jitter. Briefly, frequency offset is the shift imparted to a signal as it propagates through channel carrier systems and is subjected to tandem modulations and demodulations. Phase offset is simply the phase difference between modem transmit and receive carriers. Phase jitter, the impairment to which the present invention is directed, is mainly due to power line harmonics and ringing voltages, as mentioned above. The carrier error may be mathematically expressed as follows:

$$\theta(n) = \omega_o nT + \sum_{j=o}^{J} a_j \sin\omega_j T + \theta_o \quad (1)$$

where $\omega_o$ is the amount of frequency offset, $a_j$ is the amplitude of the sinusoidal phase jitter, $\omega_j$ is the frequency of the phase jitter, J is the number of components in the phase jitter and $\theta_o$ is the constant phase offset. A more precise statement of the carrier error takes into consideration the virtually ever present noise component $\mu(n)$ as follows:

$$\theta'(n) = \theta(n) + \mu(n) \quad (2)$$

Figure 1:
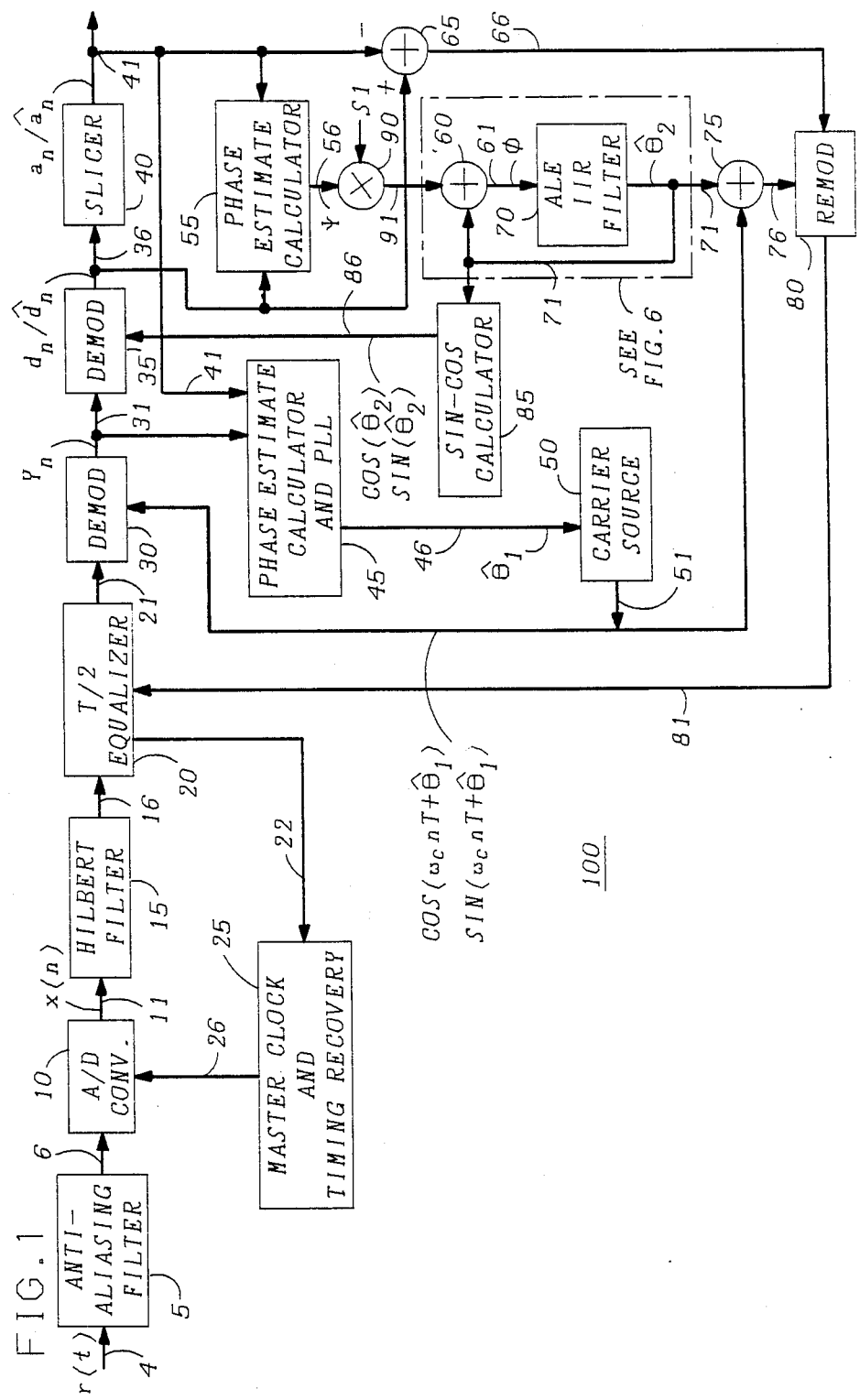
FIG. 1 shows a block diagram of the receiver portion of a voice band data modem embodying the principles of the invention.

With the foregoing in mind, we now turn to a discussion of FIG. 1 which shows receiver 100 adapted for use in a voice band modem. In particular, a transmitted signal propagating through voice grade telephone lines and possibly being subjected to the aforementioned impairments is received by receiver 100 as signal r(t) on lead 4 extending to the input of anti-aliasing filter 5. Filter 5 is a low-pass filter which filters out energy in the signal r(t) at frequencies nominally above 4000 KHz and supplies the filtered signal to lead 6.

Receiver 100 further includes master clock and timing recovery circuit 25, which generates 4096 master clock pulses every T seconds and from these pulses generates timing signals on a number of output leads to control the sequencing of the various signal processing functions within the receiver. One output lead 26 extends timing pulses to A/D converter 10 which causes converter 10 to generate passband samples x(n) of the received signal at a rate of 4/T samples per second. The passband samples are passed to Hilbert filter 15 via lead 11. For each baud interval, Hilbert filter 15 generates on lead 16 digital transform pair $x_n/\hat{x}_n$ and digital transform pair $x_n'/\hat{x}_n'$.

The Hilbert transform pairs are passed to "fractionally-spaced" equalizer 20 of conventional design via lead 16. The signals outputted by equalizer 20 to lead 21 are generated once per baud interval and are, respectively, the real and imaginary components $z_n$ and $\hat{z}_n$ of a passband equalizer $Z_n$.

The components of passband equalizer output $Z_n$ pass to demodulator 30. Demodulator 30 also receives the values $\cos(\omega_c mT + \hat{\theta}_1)$ and $\sin(\omega_c mT + \hat{\theta}_1)$ via lead 51 from carrier source 50 and generates on lead 31 a complex baseband signal $Y_n$, which has been corrected for frequency and phase offset. Here, $\hat{\theta}_1$ is a carrier phase correction estimate for frequency and phase offset as generated by phase estimate calculator and phase-locked loop circuit 45. The phase estimate calculator contained in circuit 45 estimates the phase error between the output of demodulator 30 and the output of slicer 40 and passes the estimate to the phase-locked loop circuit, e.g., a narrow-band low-pass filter, which outputs $\hat{\theta}_1$ to lead 46. Carrier source 50 generates a known demodulation angle, here $\omega_c mT$, adds $\hat{\theta}_1$ to that angle, and outputs the result to lead 51. A sin-cos calculator (not shown) interposed between carrier source 50 and demodulator 30 then passes the sin and cos values of the resulting angle to demodulator 30.

The signal YN has real and imaginary components $y_n$ and $\hat{y}_n$, which are virtually free of phase and frequency offset impairments, but which may still contain the impairment due to phase jitter. The components of Yn are fed via lead 31 to a second demodulator 35 which receives the values sin $(\hat{\theta}_2)$ and cos $(\hat{\theta}_2)$ from sin-cos calculator 85 on lead 86 and generates on lead 36 a complex signal Dn, which has been corrected for phase jitter. Here $\hat{\theta}_2$ is the phase angle estimate of the phase jitter as generated by adaptive line enhancement circuit (ALE) IIR filter 70, which is the object of the present invention, operating in conjunction with phase estimate calculator 55.

Phase estimate calculator 55 outputs to lead 56 an estimate $\psi$ of the phase of the jitter, if any, determined from the signal outputted by demodulator 35 ($d_n/\hat{d}_n$) and the signal outputted by slicer 40 ($a_n/\hat{a}_n$). Multiplier 90 multiplies the value of the phase estimate $\psi$ by a scale factor S1 and outputs the result to lead 91. The phase estimate $\psi$ is scaled in this manner to prevent a possible overflow condition from occurring in ALE IIR filter 70. ALE IIR filter 70 receives the scaled value of $\psi$ via adder 60 and lead 61 and outputs to lead 71 the angle of the phase jitter ($\hat{\theta}_2$) when it has converged thereon, as discussed below. Sin-cos calculator 85 converts the angle $\hat{\theta}_2$ into respective cos and sin values and supplies them to demodulator 35 via lead 86, as mentioned above. (Hereinafter, ALE IIR filter 70 will be referred to as ALE 70).

Figure 2:
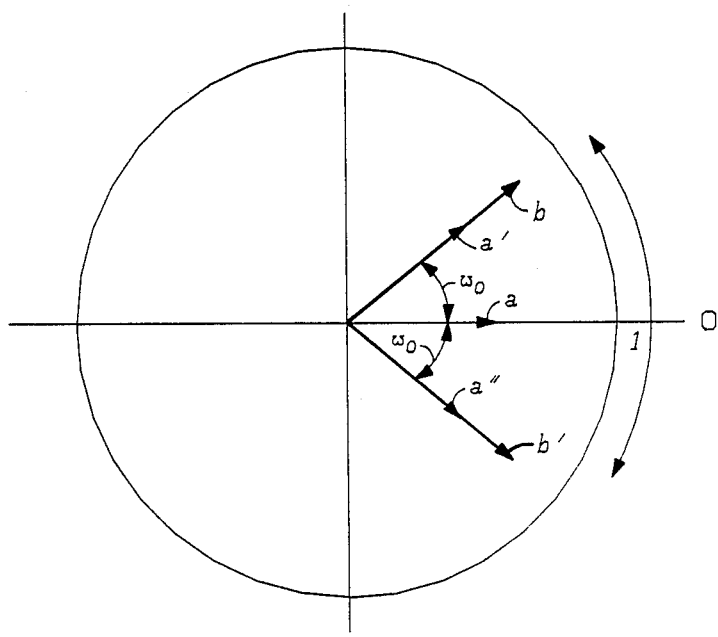
FIG. 2 shows a pole-zero plot helpful in explaining the operation of the present invention.

In particular, when modem receiver 100 is first connected to the transmitter of a modem via line 4, adaptive ALE filter 70 initializes itself by setting the angular displacement ($\omega_o$) of its complex conjugate poles at—illustratively 0 Hz—and at a radius distance within a unit circle equal to—illustratively $(0.7625)^{\frac{1}{2}}$—, as represented by point "a" shown in the pole-zero plot of FIG. 2. As is well-known to the art of modems, when two modems are first connected to each other they enter a start-up mode in which they exchange a predetermined sequence of known symbols. For each symbol received from the far end modem transmitter, phase estimate calculator 55 calculates an estimate of the phase of the jitter component contained in the symbol and passes the estimate to ALE 70. Based on the value of the phase estimate and prior value of $\hat{\theta}_2$, ALE 70 under the direction of an adaptive algorithm (discussed below) adjusts the angular displacement of its complex conjugate poles in the direction of the phase angle $\omega_o$ of the jitter as depicted in FIG. 2. The angular displacement of the complex, conjugate poles converges on the phase angle $\omega_o$ within receipt of N such estimates from phase estimate calculator 55, N being, for example, 1000. At this time, the complex, conjugate poles appear as shown by a' and a" in FIG. 2. When the aforementioned angular displacement converges on $\omega_o$, the value of $\hat{\theta}_2$ outputted to lead 71 is very close to the value of the phase angle of the jitter.

At that point, ALE 70, in accordance with the invention, increases the radius distance of its complex, conjugate poles within the unit circle to—illustratively (0.9625$\frac{1}{2}$). This increases the gain, or Q of ALE 70, as represented by points b and b'. ALE 70 also decreases scale factor S1 to correspond with the increase in the gain and changes other parameters to finely tune itself to the phase angle of the jitter during the last remaining steps of the adaptive process, as will be discussed below.

Returning to FIG. 1, when ALE 70 has adapted the value of $\hat{\theta}_2$ to the phase angle of the phase jitter, the complex signal Dn outputted by demodulator 35 to lead 36 is then virtually free of phase jitter. Consequently, the value of the phase estimate then outputted by phase estimate calculator 55 is substantially zero. As a result, ALE 70 could become detuned, thereby causing the value of $\hat{\theta}_2$ to drift away from the phase angle of the phase jitter.

To deal with this problem, adder 60 is provided with, in accordance with an aspect of the invention, a feedback path from the output to the input of ALE 70 so that ALE 70 can lock onto the final value of $\hat{\theta}_2$.

Continuing with FIG. 1 for the purpose of completing the description of modem receiver 100, slicer 40 provides on its output lead quantized versions of $d_n$ and $\hat{d}_n$, denoted $a_n$ and $\hat{a}_n$, which are so-called soft or "tentative" decisions as to what the transmitted quadrature signal points actually were. The tentative decisions are, however, a sufficiently accurate measure of what the final decisions will be that they can be advantageously used for equalizer and carrier recovery generation. (The final decisions are generated by a so-called VITERBI decoder, not shown, which receives the quantized signals via lead 41.) To this end, adder 65 provides on its output lead 66 the real and imaginary components of a complex baseband error signal. The complex error signal along with the sum of the signals outputted by ALE 70 and carrier source 50 are then remodulated into the passband by remodulator 80.

The output of remodulator 80 to lead 81 is a complex passband error signal having real and imaginary components $e_n$ and $\hat{e}_n$, which are then supplied to equalizer 20 for the purpose of coefficient updating.

As briefly mentioned above, phase jitter may be caused by the frequency of power line voltages. It is usually the case that the fundamental frequency of power line voltages, i.e., 60 Hz, is the dominant cause of phase jitter. However, the second harmonic of that frequency, i.e., 120 Hz, may also cause a substantial level of phase jitter to be present in the received symbols. Note, however, that the frequencies need not be harmonically related.

To deal with phase jitter having a dominant component of a first frequency and having another, or secondary component of a second frequency, a second ALE IIR filter may be added to receiver 100 in parallel with ALE IIR filter 70, in accordance with an aspect of the invention. In fact, theoretically, N such IIR ALEs may be arranged in parallel to deal with phase jitter having N components.

Figure 3:
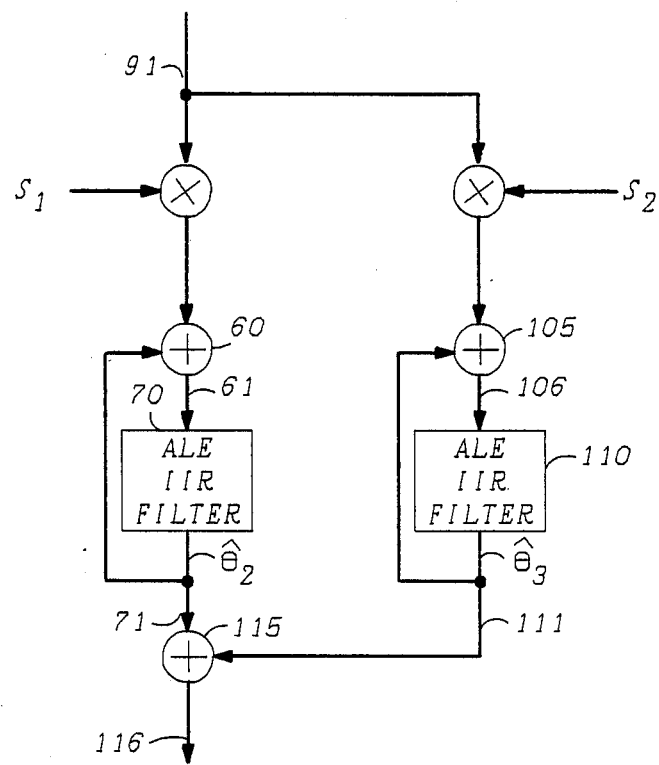
FIG. 3 shows an arrangement which may be employed in the modem receiver of FIG. 1 to attenuate phase jitter having more than one component.

Turning then to FIG. 3, there is shown a section of receiver 100, in which ALE IIR filter 110 and corresponding adder circuit 105 have been added thereto to correct for a second component of phase jitter. The way in which ALE IIR 110 and adder 105 operate will not be discussed herein since their operation is substantially similar to that of ALE IIR filter 70 and adder 60, respectively. In order to correct for two components of phase jitter it is necessary to inhibit one of the filters 70 and 110 while training the other. This prevents both filters from attempting to converge on the same component of the phase jitter. Therefore, in contemplation of this aspect of the invention, one of the filters, for example, ALE 110, is inhibited to allow the other filter, ALE 70, to converge on and attenuate the dominant component of the phase jitter without interference from ALE 110. Thereafter, the inhibit is removed from ALE 110 to allow it to converge on and attenuate the second component of the phase jitter. The phase angles $\hat{\theta}_2$ and $\hat{\theta}_3$ outputted by ALES 70 and 110 to leads 71 and 111, respectively, are supplied to adder 115, which then outputs the sum thereof to lead 116 connected to one input of adder 75 (FIG. 1).

We turn now to a discussion of the theoretical underpinnings of the invention.

Figure 4:
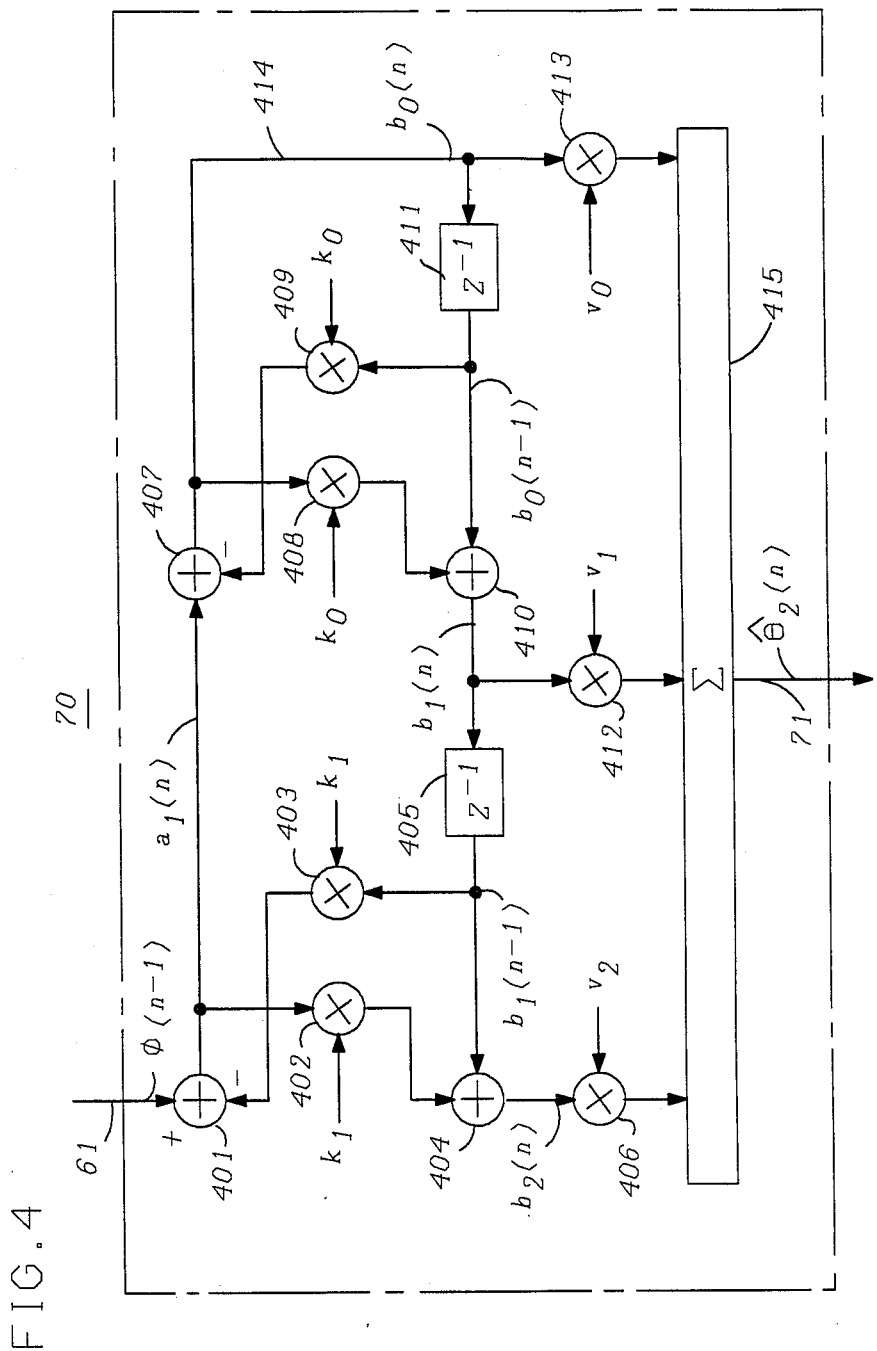
FIG. 4 shows an IIR filter structure helpful in explaining the theoretical underpinnings of the invention.

In particular, for the implementation of the IIR filter structure of ALE 70 I elected to use the model transfer function for the IIR filter structure that is disclosed in the article entitled "Detection of Multiple Sinusoids Using an Adaptive Cascaded Structure" by R. A. David, S. D. Stearns and R. J. Fogler, published in *ICASSP* 83 at pp. 21.3.1–21.3.4, which is mathematically stated as follows:

$$H_j(z) = \frac{\left[\frac{\hat{\omega}(n)}{1+r^2}\right]z^{-1} - z^{-2}}{1 - \hat{\omega}(n)z^{-1} + r^2 z^{-2}} \quad (3)$$

where $\hat{\omega}(n)$ is an adaptive parameter for selecting the angular displacement of the complex conjugate poles around the unit circle (FIG. 2) and r is the fixed pole radius, which for minimum bandwidth restrictions should be selected close to 1. The z factors in equation (3) are delay functions. A two-multiplier lattice filter structure was selected for the implementation of equation (3), as shown in FIG. 4. The two-multiplier lattice structure shown in FIG. 4 is well-known and will not be discussed herein. However, it suffices to say that the two-multiplier lattice structure comprises a first stage including adders 401 and 404, multipliers 402 and 403 and delay element 405. The signals inputted to multipliers 402 and 403 are scaled by the value of reflection coefficient $k_1$. The signal outputted by the first stage to multiplier 406 is then scaled by the value of tap coefficient $v_2$. The second stage of the filter is essentially identical to the first stage and includes adders 407 and 410, multipliers 408 and 409 and delay element 411. The signals inputted to multipliers 408 and 409 are scaled by the value of reflection coefficient $k_o$. Similarly, the signal outputted by the second stage to multiplier 412 is scaled by the value of tap coefficient $v_1$. A third, or termination stage comprising lead 414 transports the signal outputted by adder 407 to delay element 411 and multiplier 413. The signal at multiplier 413 is then scaled by tap coefficient $v_o$, as was similarly done in the preceding stages. The signals outputted by multipliers 406, 412 and 413 are then summed by summation circuit 415 to form the value of $\hat{\theta}_2$.

As will be discussed below, the values of the aforementioned reflection and tap coefficients are updated following the receipt of a rough phase estimate from phase estimate calculator 55 and the forming of the latest value of $\hat{\theta}_2$. The updated coefficients are then used to filter the next, or subsequent signal inputted to ALE 70 via lead 61.

Applying a transformation from direct canonical form or two-multiplier-lattice form results in the following mathematical expressions for the reflection coefficients $k_o$ and $k_1$ and tap coefficients $v_o$, $v_1$, and $v_2$;

$$k_1 = r^2 \quad (4a)$$

$$k_o = \hat{\omega}/(1+r^2) \quad (4b)$$

$$v_o = r^2 - k_o v_1 \quad (4c)$$

$$v_1 = r^2 k_o \quad (4d)$$

$$v_2 = -1 \quad (4e)$$

(The expressions for the k and v coefficients were obtained from equation (3) using the transformation procedures outlined in the article entitled "Fixed-Point Implementation Algorithms for a Class of Orthogonal Polynominal Filter Structures" by J. D. Markel and A. H. Gray, published in the *IEEE Transactions on Acoustics, Speech and Signal Processing*, Vol. ASSP-23, No. 5, October, 1975, pp. 486–494, which is hereby incorporated by reference.)

Since $r^2$ would be known, then, the only actual adaptive variable in the above equations is $k_o$, which happens to be related to the angular position of the complex conjugate filter poles around the unit circle. The system, or node, equations taken at nodes $a_1$, $b_o$, $b_1$, and $b_2$ shown in FIG. 4 may be mathematically stated as follows:

$$\begin{aligned} a_1(n) &= \phi(n-1) - k_1 b_1(n-1) \\ &= \phi(n-1) - r^2 b_1(n-1) \end{aligned} \quad (5)$$

$$b_o(n) = a_1(n) - k_o(n) b_o(n-1) \quad (6)$$

$$b_1(n) = k_o(n) b_o(n) + b_o(n-1) \quad (7)$$

$$\begin{aligned} b_2(n) &= k_1 a_1(n) + b_1(n-1) \\ &= r^2 a_1(n) + b_1(n-1) \end{aligned} \quad (8)$$

where $\phi$ is the value of the digital signal outputted by adder 60 to lead 61, and n = 1, 2, 3, . . . N.

Accordingly:

$$\hat{\theta}_2(n) = \sum_{i=0}^{2} v_i b_i(n) \quad (9)$$

which is the value of the digital signal outputted by the summation circuit 415 (It is noted that $\hat{\theta}_2$ will hereinafter be referred to as $\hat{\theta}$, except as indicated).

Using the least means square (LMS) algorithm to minimize the difference between the value of the signal outputted by phase estimate calculator 55 and the value of the digital signal $\hat{\theta}$ outputted by ALE 70 to lead 71 and thence to adder 60 (FIG. 1) in order to update $k_o$ yields the following expression:

$$k_o(n) = k_o(n-1) - \nu \psi(n) \frac{\partial \psi(n)}{\partial k_o} \quad (10)$$

where $\nu$ is a predetermined step size. Since;

$$\psi(n) = \theta(n) + \mu(n) - \hat{\theta}(n) \quad (11)$$

where $\mu(n)$ is the uncorrelated noise component, then only $\theta(n)$ is a function of $k_o$, as shown by the following expression:

$$\frac{\partial \psi(n)}{\partial k_o} = -\frac{\partial \hat{\theta}(n)}{\partial k_o} \equiv \theta_k(n) \quad (12)$$

Substituting equation (12) into equation (10) then yields the following expression:

$$k_o(n) = k_o(n-1) + \nu \psi(n) \theta_k(n) \quad (13)$$

Since the structure shown in FIG. 4 is recursive in nature, then the gradient term, $\hat{\theta}(n)$ will also be recursive. Defining intermediate gradients;

$$\alpha_i(n) = \frac{\partial a_i(n)}{\partial k_o(n)} \text{ and} \quad (14)$$

$$\beta_i(n) = \frac{\partial b_i(n)}{\partial k_o(n)}$$

where $i = 0, 1, 2 \ldots N$, then the final gradient may be stated as follows:

$$\theta_k(n) = \sum_{i=0}^{2} \nu_i \beta_i(n) + \sum_{i=0}^{2} \frac{\partial \nu_i}{\partial k_o(n)} b_i(n) \quad (15)$$

Restating equation (4) in terms of $\nu_i$ yields the following mathematical expressions:

$$\nu_0 = r^2 - k_o(n) \nu_1 \quad (16)$$

$$\nu_1 = r^2 k_o(n) \text{ and}$$

$$\nu_2 = -1.0$$

whose gradients can be expressed as follows:

$$\frac{\partial \nu_0}{\partial k_o} = -\nu_1 - k_o(n) r^2 = -2r^2 k_o(n) \quad (17)$$

$$\frac{\partial \nu_1}{\partial k_o} = r^2$$

$$\frac{\partial \nu_2}{\partial k_o} = 0$$

Substituting these gradients into equation (15) then yields the following result:

$$\theta_k(n) = \sum_{i=0}^{2} \nu_i \beta_i(n) + r^2 b_1(n) - 2r^2 k_o(n) b_o(n) \quad (18)$$

The latter equation may be completed by evaluating $\beta_i$ using equations (5) through (8) as follows:

$$\beta_o(n) = \alpha_1(n) - b_o(n-1) - k_o(n)\beta_o(n-1) \quad (19)$$

$$\beta_1(n) = b_o(n) + k_o(n)\beta_o(n) + \beta_o(n-1)$$

and $$\beta_2(n) = r^2 \alpha_1(n) + \beta_1(n-1)$$

where $\alpha_1(n) = -r^2 \beta_1(n-1)$.

At this point, equations (19) may be substituted into equation (18), which is then substituted into equation (13) to complete the update of $k_o$.

Figure 5:
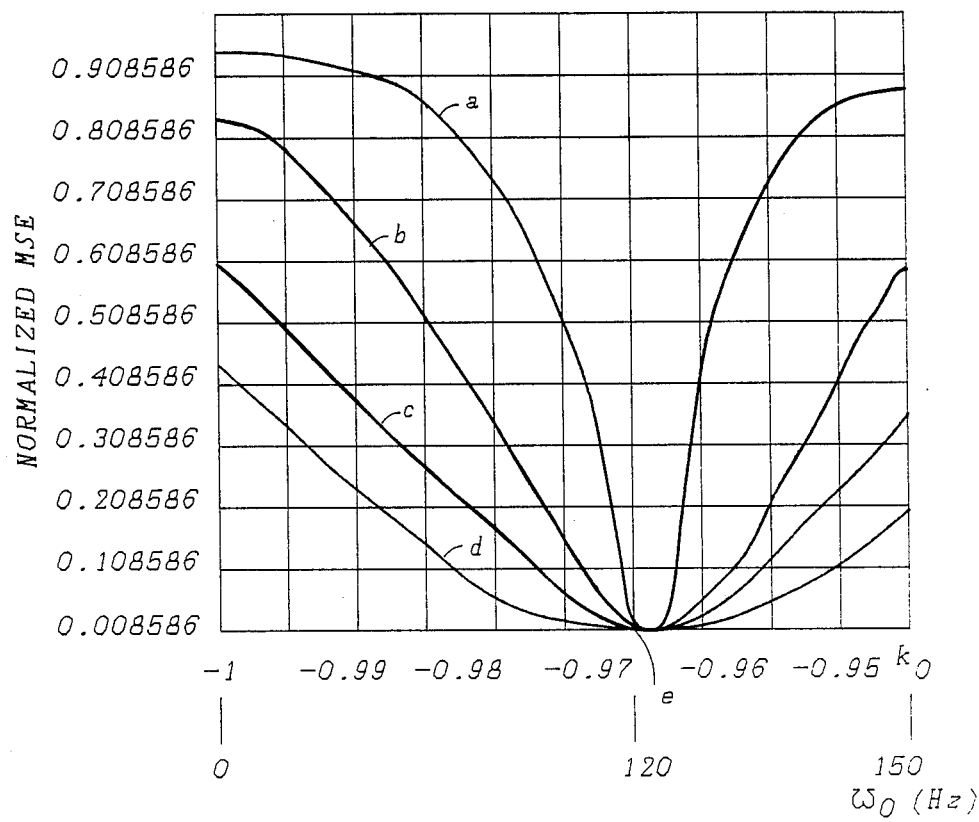
FIG. 5 shows a graph of the performance surface of the IIR filter of FIG. 4.

The actual value of the radius r may be determined experimentally using performance surfaces constructed for ALE 70, as shown in FIG. 5. Curves a, b, c and d were derived from the following mathematical expression in which $r^2$ corresponds to 0.9625, 0.8625, 0.7625 and 0.6625, respectively:

$$\frac{E[P(e^{j\omega T})P^*(e^{j\omega T})]}{E[\Phi(e^{j\omega T})\Phi^*(e^{j\omega T})]} = \quad (20)$$

$$\frac{A^2 |1 - e^{-j\omega_o T} \hat{H}_1(e^{j\omega_o T})|^2 + 2\sigma_\mu^2/(1+r^2)}{A^2 + \sigma_\mu^2}$$

where E is the expected minimum value of $\psi(n)$, P is the Z-transform of $\psi(n)$, A is the amplitude of the single sinusoid, $\sigma$ is the variance of the white noise $\mu$, $H_I$ is given by equation 3 and $\Phi$ (z) is the Z-transform of $\phi(n)$. In addition $\omega_o$ corresponds to 120 Hz with 20 dB of SNR (A relative to $\sigma_\mu^2$). The bandwidth at $r^2 = 0.9625$ and at $r^2 = 0.6625$ is equal to 16.8 Hz for T = 2400 symbols/sec and 160 Hz for T = 2400 symbols/sec., respectively.

It is seen from FIG. 5, that the performance surface of ALE 70 is unimodal since there is only one minimum. However, because the convergence of ALE 70 is based on a gradient search, it behaves differently for each curve. For example, a gradient search along curve "a" ($r^2 = 0.9625$) beginning at $k_o = -1$ would not be meaningful since the slope of curve "a" within the region of $k_o = -1$ is virtually flat. Whereas, a gradient search along curve "c" ($r^2 = 0.7625$) would be meaningful since the slope of that curve is fairly steep beginning at $k_o = -1$. Thus, in accordance with the invention, ALE 70 starts the gradient search along curve "c" ($r^2$ set to 0.7625) starting at $k_o = -1$ and recursively adapts the value of $k_o$ based on the prior value of $\hat{\theta}_2$ and the latest value of the phase error estimate $\psi$ that it receives. ALE 70 continues to do this until the minimum value of the phase error estimate $\psi$ is reached, as explained above. The minimum value of the phase error estimate $\psi$ is obtained when curve "c" is at its minimum point, i.e. point "e". ALE 70 then increases its gain, or Q, by shifting to curve "a", i.e., by increasing $r^2 = 0.9625$.

One aspect not shown in FIG. 4, is the manner in which the various reflection and tap coefficients shown therein are adaptively generated in accordance with the respective equations noted above. One skilled in the art of modems could take the approach of using specific circuitry designed to recursively generate such coefficients. A better approach, one which I consider to be the preferred embodiment of the invention, uses a digital signal processor (DSP), such as, for example, the DSP-20 available from AT&T. The DSP-20 is disclosed in the *Bell System Technical Journal*, September, 1981, VOL. 60, No. 7, Part 2, pp. 1431-1462, which is hereby incorporated by reference. In fact, the DSP, as programmed in the manner discussed below, not only generates the reflection and tap coefficients, but also implements the two-multiplier lattice structure shown in FIG. 4. The DSP also implements the functions performed by phase estimate calculator 55, multiplier 90 and adder 60. Thus, a single DSP may be used in place of four circuits shown in FIG. 1, namely phase estimate calculator 55, multiplier 90, adder 60 and ALE 70.

Figure 6:
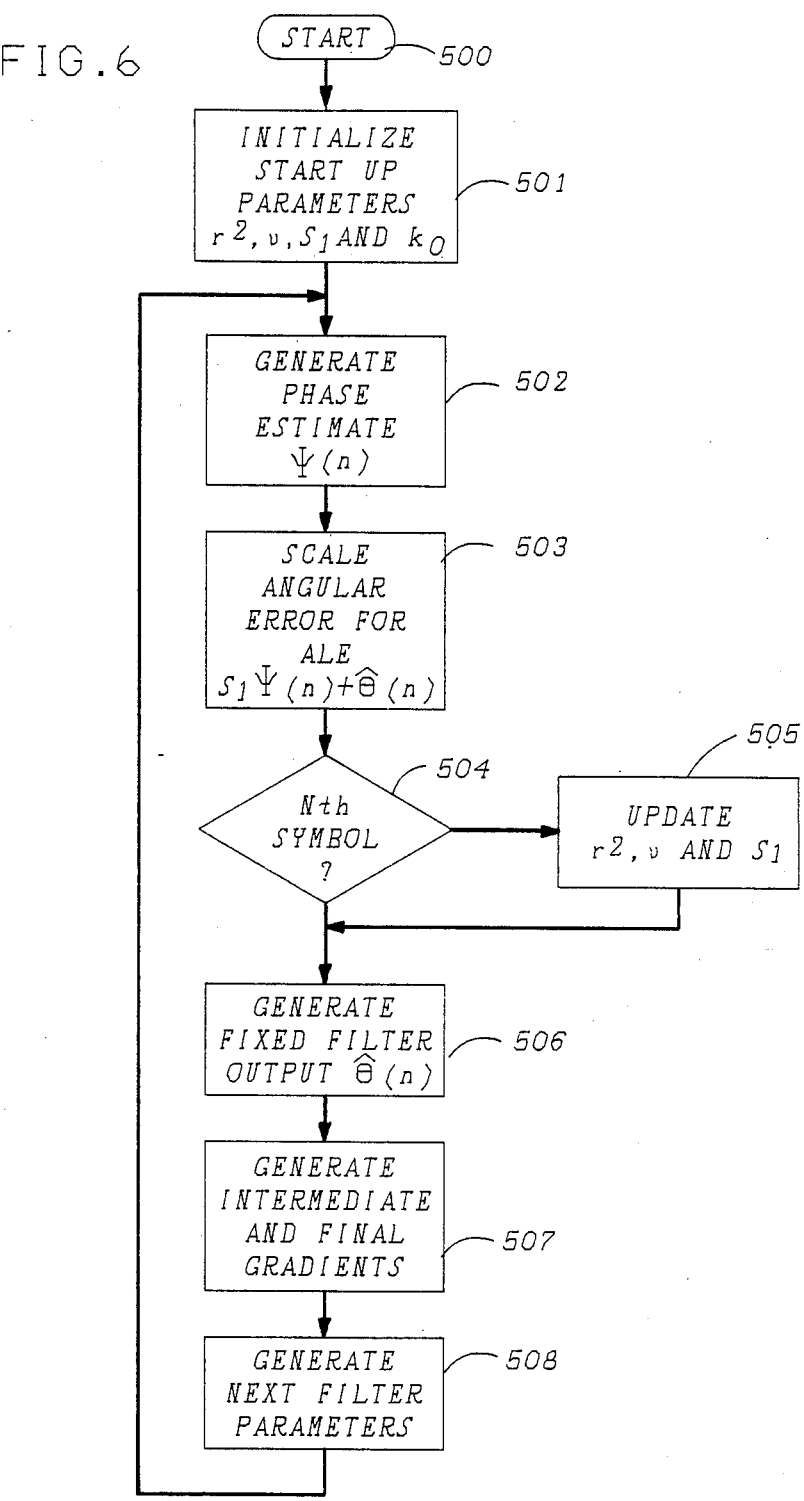
FIG. 6 shows a flow chart of a program which implements the invention on a digital signal processor.

Turning then to FIG. 6, there is shown the software program which implements the invention on a DSP. In particular, the program is entered at block 500 when modem receiver 100 is connected to a far-end modem transmitter. The program then proceeds to block 501 when the first of the so-called start-up, or training symbols are received via lead 4. At block 501, the program sets (a) $r^2$ to 0.7625, (b) the unit step size $\nu$ to one-half, (c) the scale factor S1 to one-quarter, and (d) the initial value of $k_o$ to $-1$. The program then proceeds to block 502 where it calculates an estimate of the phase error between the signal outputted by demodulator 35 and the signal outputted by slicer 40. The program does this using the following mathematical expression:

$$\psi(n) = \hat{d}_a a_n - \hat{a}_n d_n \qquad (21)$$

The program then proceeds to block 503 where it scales the value of $\psi(n)$ by the value of scaling factor S1. The program then adds the last value of $\hat{\theta}$ that it generated to the scaled phase estimate and then proceeds to block 504. It is of course understood that the last value of $\hat{\theta}$ would be zero on the first pass through the program.

At block 504, the program checks a counter stored in the memory of the DSP to see if the contents of the counter is equal to or greater than 1000. If the contents of the counter, which is initialized to zero at block 501, is less than 1000, then the program increments the value contained therein by one, stores the new value in the DSP memory and proceeds to block 506. (It is noted that the contents of the counter effectively tracks the number of symbols that receiver 100 receives from the far-end transmitter.) As discussed above, the IIR filter substantially converges on the phase angle of the phase jitter by the time N, i.e., 1000, symbols have been received from the far-end transmitter. At that time, the program proceeds to block 505 where it changes the value of $r^2$ to increase the gain of IIR filter. The program also changes the scale factor S1 to one-sixteenth and decreases the unit step size $\nu$ to one-eighth. The program then proceeds to block 506.

At block 506, the program generates the values of node equations $a_1$, $b_o$, $b_1$, and $b_2$, in accordance with equations 5 through 8, discussed above in connection with FIG. 4. When the program completes that task it then generates the filter output $\hat{\theta}(n)$ in accordance with equation (B 9). It is to be understood of course that the values generated at block 506 are more or less meaningless on the first pass through the program. However, on successive passes through the program responsive to receipt of symbols from the far end transmitter, the values of the respective node equations begin to adapt, thereby causing $\theta(n)$ to adjust to the phase of the jitter.

At block 507, the program next generates the intermediate gradients $\alpha_1$ and $\beta_i$ and final gradient $\theta_k(n)$ in accordance with the respective equations discussed above. The program then proceeds to block 508 where it recursively updates the values of the aforementioned reflection and tap coefficients. The program then returns to block 502 where it generates the phase estimate between the input and output of slicer 40 based on the latest, or next symbol that is received from the far-end transmitter and then proceeds to block 503 to process that estimate, in the manner discussed above.

The foregoing is merely illustrative of the principles of the invention. Those skilled in the art will be able to devise numerous arrangements which, although not explicitly shown or described herein, embody those principles and are within its spirit and scope.

What is claimed is:

1. An infinite-impulse-response filter arranged to output a signal whose value adaptively converges on the phase angle of jitter contained in a series of received signals, said filter having at least two complex, conjugate poles, said filter comprising:
   means for initially disposing said at least two complex, conjugate poles at a first predetermined radius within a unit circle, and
   means for adaptively increasing the angular displacement of said complex, conjugate poles within said unit circle responsive to receipt of an estimate of the phase angle of said jitter contained in the latest one of said received signals combined with the value of the signal priorly outputted by said filter and for generating said filter output signal as a function of the latest value of said angular displacement.

2. The invention set forth in claim 1 wherein said means for disposing includes means for disposing said at least two complex, conjugate poles at a second predetermined radius within said unit circle to increase the gain of said filter when said angular displacement substantially equals the phase angle of said jitter.

3. The invention set forth in claim 1 further comprising at least a second infinite-impulse-response filter for outputting a signal whose value adaptively converges on the phase angle of a second component of jitter contained in said series of received signals.

4. The filter set forth in claim 1 further comprising an input terminal for receiving said estimate and wherein said output signal is returned to said input terminal via a feedback path for use by said filter in the forming of said output signal associated with a subsequent one of said series of received signals.

5. An infinite-impulse-response filter for adaptively adjusting the value of its output signal to the phase angle of jitter contained in a series of received symbols comprising
   means for receiving a signal representing the value of an estimate of the phase angle of jitter contained in the latest one of said received symbols combined with the value of a signal priorly outputted by said filter,
   means for generating a plurality of signals at respective filter nodes $b_i$ as a function of said combined signal and respective reflection coefficients, $k_o$ and $k_1$,
   means for forming said filter output signal as a function of the products of said node signals and respective ones of a plurality of tap coefficients, $v_i$, and
   means for updating the values of individual ones of said reflection and tap coefficients for use by said filter in the forming of said filter output signal associated with a subsequent one of said symbols.

6. The filter set forth in claim 5 wherein said filter has at least two complex, conjugate poles and wherein said filter further comprises
   means for initially disposing said poles at a first predetermined radius within a unit circle with a predetermined angular displacement between said poles, and
   means for increasing said angular displacement around said unit circle as a function of the adaptive value of one of said reflection coefficients, $k_o$.

7. The filter set forth in claim 6 wherein said poles are disposed at a second predetermined radius within said unit circle to increase the gain of said filter when the value of said filter output signal converges on said phase angle.

8. The invention set forth in claim 5 further comprising at least a second infinite-impulse-response filter for outputting a signal whose value adaptively converges on the phase angle of a second component of jitter contained in said series of received symbols.

9. A method of providing a signal whose value adjusts to the phase angle of jitter contained in each of series of received signals, said method employing an infinite-impulse response filter having at least a pair of complex, conjugate poles for generating said signal, said method comprising the steps of:

disposing said complex, conjugate poles at a first predetermined radius within a unit circle, increasing the angular displacement of said complex, conjugate poles within said unit circle responsive to an estimate of the phase angle of said jitter contained in the latest one of said received signals combined with the value of the signal priorly outputted by said filter, and generating said filter output signal as a function of the latest value of said angular displacement.

* * * * *

UNITED STATES PATENT AND TRADEMARK OFFICE
CERTIFICATE OF CORRECTION

PATENT NO. : 4,847,864
DATED : July 11, 1989
INVENTOR(S) : Robert L. Cupo

It is certified that error appears in the above-identified patent and that said Letters Patent is hereby corrected as shown below:

Column 3, line 68, "$O_2$" should read --$\hat{O}_2$--.

Column 9, line 17, Equation (21) should read --$\psi(n)=\hat{d}_n$--.

Column 9, line 48, "equation (B 9)" should read --equation (9)--.

Column 9, line 54, "$\theta(n)$" should read --$\hat{\theta}(n)$--.

Signed and Sealed this

Fourth Day of December, 1990

Attest:

HARRY F. MANBECK, JR.

*Attesting Officer*     *Commissioner of Patents and Trademarks*